April 8, 1958     J. L. TEDALDI     2,829,806
DISPENSING VALVE FOR GAS PRESSURE CONTAINERS
Filed Nov. 4, 1953
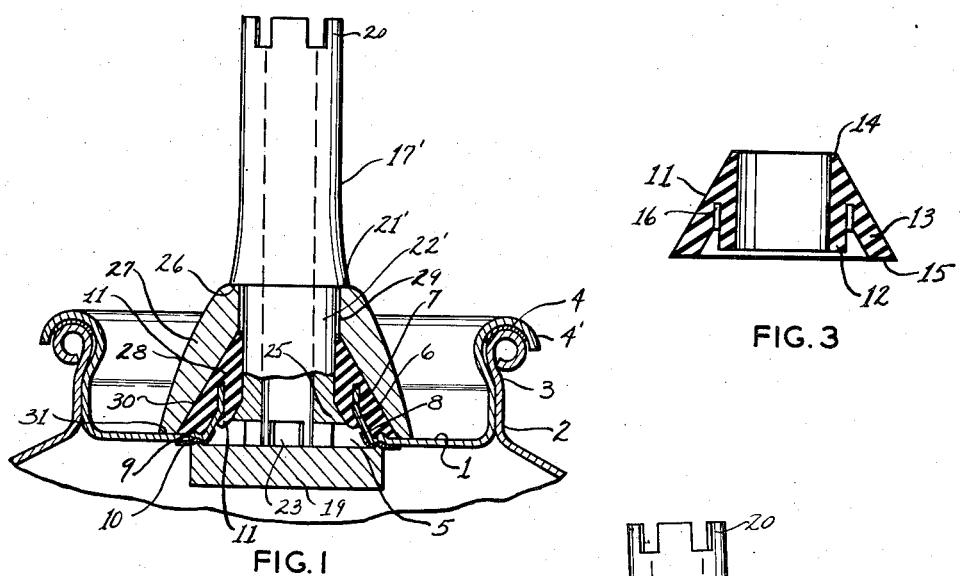
FIG. 1
FIG. 3
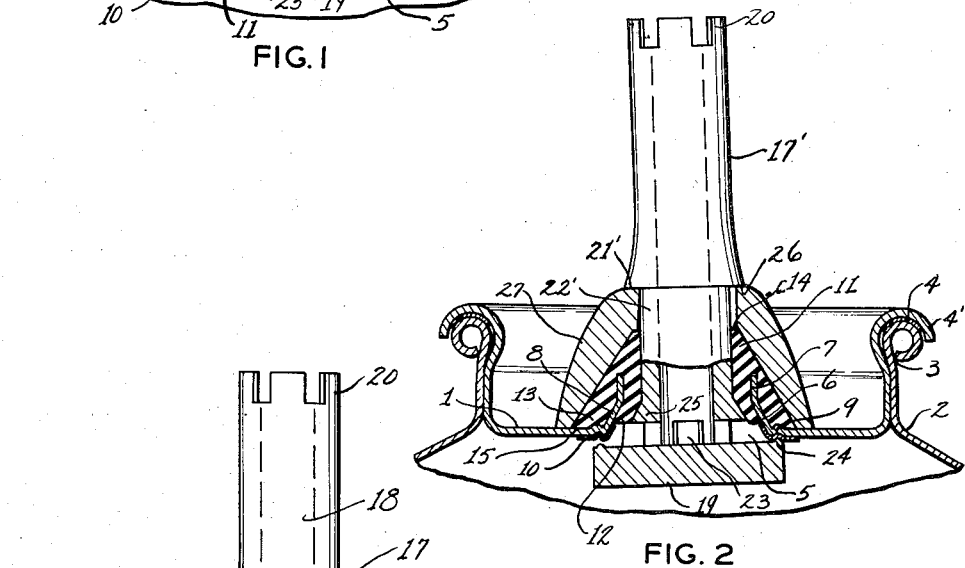
FIG. 2
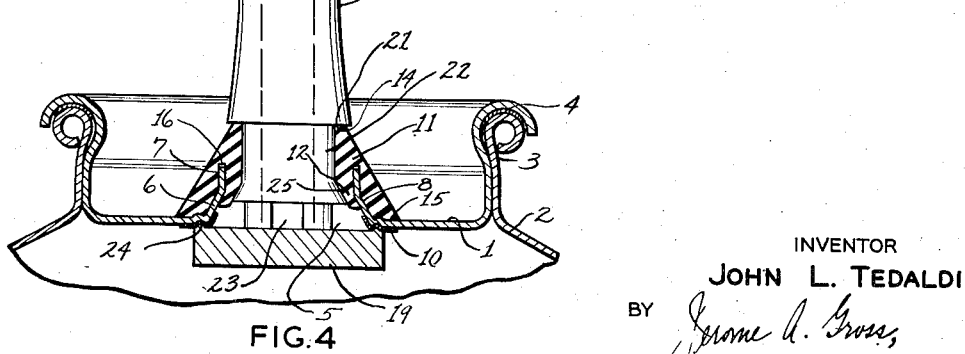
FIG. 4
INVENTOR
JOHN L. TEDALDI
BY
ATTORNEY

United States Patent Office 2,829,806
Patented Apr. 8, 1958

2,829,806

DISPENSING VALVE FOR GAS PRESSURE CONTAINERS

John L. Tedaldi, Maplewood, Mo., assignor to Development Research, Inc., St. Louis, Mo., a corporation of Missouri Application November 4, 1953, Serial No. 390,192

3 Claims. (Cl. 222—394)

The present invention relates to tiltable dispensing valves for single-use gas pressure containers, and particularly to the type of valve embodying a rigid tubular stem seated within a resilient seal and having a valve head within the container and a dispensing spout extending outward thereof through an aperture in the container top wall.

Single-use dispensing valves must be constructed and assembled at a minimum of cost. Nevertheless, leakage around the tubular stem of the valve, and around the sealing member itself, must be avoided. Further, it is desirable for the user that there be some degree of relationship between the degree of tilting of the valve stem and rate of flow through the dispensing spout. This has seldom been achieved in single-use valves.

The purposes of the present invention include: to provide a single-use dispensing valve which is readily constructed of few inexpensive parts and easily assembled; which is neat in appearance and assembled onto the container; and which dispenses without leakage, either through the spout or around it. Additional purposes are to create a valve which is positive in its opening and closing, and which produces a flow at a rate substantially proportionate to the degree of tilt. Other objects will be apparent from the remainder of this specification and from the claims hereof.

Before describing the valve in detail, as shown by the drawings herewith, certain of the features of construction may be mentioned. The valve utilizes a large circular valve head which is subject to the internal gas pressure within the container. This internal gas pressure, together with the resiliency of the sealing member, serves to restore the valve to erect position and hold it closed without the use of external springs.

An important new principle is the use of a sprayed rubber valve head seal, the sprayed rubber being applied to an annular area including a groove on the inner side of the container top around its stem aperture. The valve head is provided with a ring-like protruding edge which mates with the sealing groove so formed. Regardless of the direction in which the valve stem is tilted, the engagement of such ring-like edge within the groove restrains the valve head from lateral sliding across the valve seat end of the sealing member. This serves to assure positive opening and closing of the tilting valve.

A unique resilient sealing member is utilized which is installed from the outside. It includes a sleeve portion projecting downward inside the flange around the container top aperture and pressed against it by a tapering enlargement on the valve stem. The sealing member includes a skirt which seals against the outer side of the flanged aperture; and the sealing member as a whole serves as a resilient spring to urge the tiltable valve stem to erect, closed position.

A decorative resilient seal cover may be utilized together with the resilient sealing member. This seal cover is a flaring skirt, encompassing the sealing member, restricting it from undue deformation, and serving with it as a resilient spring. The drawings herewith illustrate embodiments of the present invention both with and without such seal cover.

In the accompanying drawings:

Figure 1 is a sectional view of a dispensing valve embodying the present invention and including a seal cover, the valve being shown mounted in the upper portion of a container;

Figure 2 is a view similar to Figure 1, showing the valve in tilted, partly open position;

Figure 3 is a sectional view of the sealing member of the valve shown in Figures 1 and 2; and Figure 4 is a view similar to Figure 1, showing a modified form of invention utilizing a sealing member without any seal cover.

In the present invention, the top member 1 of a single-use dispensing container 2 itself forms part of the valve structure. It is customary to affix the top member 1 to the container 2 by swaging it outwardly beneath the container lip 3 and effecting tight sealing by use of a sprayed rubber rim seal 4 applied within the curved rim 4' of the container top.

The top member 1 conventionally has a central circular aperture 5. In the present invention this aperture 5 is surrounded by an outward flange, generally designated 6, having a substantially cylindrical edge portion 7 and a tapering flange portion 8 outstanding from the top member 1. Impressed in the inner surface of the top member 1, around the base of the tapering flange portion 8, is a concentric valve seat groove 9. This groove 9 and the area adjacent it is coated evenly with a resilient material such as sprayed rubber, here forming the sprayed rubber valve seat designated 10. This involves little complication inasmuch as the curved rim 4' must be subjected to the sprayed rubber process for the purpose of applying the rim seal 4.

Referring to Figure 4, illustrating the simpler of the two embodiments shown, a difference between the present invention and the prior art will be at once apparent. In valves utilized heretofore in connection with disposable containers, resilient sealing members have been applied to the inside of the container top member. In contrast, I apply the resilient sealing member 11 to the outer side of the top member 1.

The resilient sealing member 11, shown in Figure 3 in its shape prior to assembly, is preferably molded of synthetic rubber. It comprises an inner substantially cylindrical sleeve 12 and an outer, somewhat flaring skirt 13 molded integrally and joined at their upper portions, terminating in an upper annular abutting margin 14. The skirt 13 has a lower skirt margin 15 which is presented abuttingly against the upper surface of the top member 1 around the flange 6. The inner surface of the skirt 13 follows the contour of the tapering flange portion 8 of the top member 1; and the space between the outer skirt 13 and the inner sleeve 12 terminates at its upper end in an annular recess 16, which accommodates the cylindrical edge portion 7.

While the outer skirt 13 and the annular recess 16 contribute to sealing the resilient sealing member 11 to the container top member 1, the most important portion of the sealing member 11, from the standpoint of its sealing effect, is the inner sleeve 12. The functioning of this sleeve 12 must be considered in relation to the structure of the rigid tiltable valving spout 17, which will now be described.

In the claims, the terms "axial" and "radial" are used with reference to a center line through the tubular stem 18.

The tiltable valving spout 17 may be molded from a variety of the more rigid plastics. It includes a tubular stem 18, which extends from a valve head 19, within the container, through the aperture 5 and outwardly to a dispensing tip 20. Inward of the tip 20, it is gradually radially enlarged and then stepped back sharply in the formation of an inwardly presented shoulder 21, which, in the embodiment shown in Figure 4, abuts the upper annular abutting marging 14 of the resilient sealing member 11. Compressive force in the sealing member 11, exerted between the shoulder 21 and the container top member 1, makes the sealing member 11 a compression spring, which urges the tiltable valving spout 17 to erect position.

Downward from the inwardly presented shoulder 21, the valving spout 17 continues in a tubular neck portion 22 which terminates at its lower end in the valve head 19. Adjacent the valve head 19, the neck portion 22 is penetrated by a plurality of lateral ports 23, through which the container contents flow to enter the tubular stem 18.

Around the upper edge of the valve head 19 is an integrally formed annular ring 24, of such diameter and shape as to mate with the valve seat groove 9 in the container top member 1. Referring to Figure 2, which shows the more complex embodiment in the open position, on tilting the valving spout 17' in any direction, the ring 24 will be retained in the groove 9 and restrained by it from lateral sliding. Tilting will thus result in immediately positive opening of the valve head 19 from the seat groove 9, and the amount of opening will be substantially proportional to the degree of tilt. Thus, under a given gas pressure, the flow of contents of the dispensing container will vary as a function of the degree of tilt.

The closing of the ring 24 against the sprayed rubber valve seat 10 of the groove 9 will be positive and without leakage. The area of the valve head 19 exposed of gas pressure within the container is relatively large. The forces applied thereto, by gas pressure and spring compression, are resisted over the narrow surface of the ring 24. The ring 24 is thus pressed firmly into the sprayed rubber valve seat 10, overcoming any tendency toward leakage which might occur if the same forces were reacted over a larger area.

The tubular neck portion 22 of the tiltable valving spout 17 has a tapering radial enlargement 25 which terminates abruptly immediately above the lateral ports 23. Its cooperation with the inner sleeve 12 of the sealing member 11 will be now described.

In assembling the valve components, the resilient sealing member 11 is first placed and held in position with its annular recess 16 engaging the cylindrical edge portion 7 of the flange 6. The dispensing tip portion 20 of the valving spout 17 is inserted through the inner sleeve 12 of the sealing member 11 from the inner side, and the valving spout 17 is pressed outward until the ring 24 of the valve head 19 contacts the sprayed rubber valve seat 10. This forces the sleeve 12 of the sealing member 11 over the shoulder 21 and down the neck portion 22. The lower portion of the inner sleeve 12 is held distended outwardly by the tapering radial enlargement 25, in sealing contact against the inner surface of the tapering flange portion 8. Figure 3 shows the resilient sealing member 11 before it is so distended; and its unstressed shape there shown should be contrasted with its distended shape, shown in Figures 1, 2 and 4.

The slope of the tapering radial enlargement 25 substantially follows the slope of the tapering flange portion 8. Referring to Figure 2, left side, it is apparent that when the valving spout 17 is tilted, its motion is substantially parallel to the inner surface of the tapering flange portion 8. Therefore, there is little tendency to move the tapering radial enlargement 25 away from the flange portion 8, and no leakage results when the valve is open.

The lower portion of the inner sleeve 12 serves an important sealing function in holding tightly against the tapering radial enlargement 25 by hoop tension. This tension will continue regardless of the distortion of the sealing member 11 under tilting forces, and hence no leakage can occur between the sealing member 11 and the valving spout 17.

For simplicity, the description heretofore has been directed to the simpler embodiment shown in Figure 4. The embodiments shown in Figures 1 and 2 are similar to Figure 4 save that the rigid tiltable valving spout 17' has a longer neck portion 22'; and the inward presented shoulder 21' at the upper end thereof abuts against an upper annular margin 26 of a resilient skirt-shaped seal cover 27, as shown in Figures 1 and 2. The seal cover 27 may be formed of any resilient material, preferably having an elastic modulus similar to that of the sealing member 11, preferably polyethylene plastic or artificial rubber. Decorative color may be utilized here. The seal cover 27 has an outer contour 28 of any pleasing shape, an upper cylindrical bore 29 which encloses the upper end of the neck portion 22' of the tiltable valving spout 17', and an outwardly flared inner surface 30 so shaped as to correspond with and confine the outer surface and the upper end of the resilient sealing member 11. The seal cover 27 further has an annular lower margin 31 abutting against the outer surface of the container top member 1 around the outer skirt 13 of the sealing member 11.

Since the seal cover 27 serves as a resilient spring, the function of erecting the tiltable valving spout 17 may be taken over completely by it. In this case, the material for the sealing member 11 may be selected primarily on the basis of its sealing qualities.

One of the problems involved in the packing of single-use gas pressure dispensing containers is the insertion of gas under pressure within the container. It is not convenient in mass production, to tilt a valving spout to apply gas through it to the container. Accordingly, the charging operation normally requires that valving spouts be pressed axially downward. The valve construction of the present invention facilitates such axial depressing of the valve stems, for the resilient sealing member 11 is highly elastic in shear.

From the foregoing disclosure and drawings, various modifications of the valve structure herein illustrated will become apparent to those familiar with the problems of the prior art. Accordingly, the present invention is to be considered as fully coextensive with the inventive principles herein disclosed.

I claim:

1. A tiltable dispensing valve for gas pressure containers, comprising an apertured top member having an outward flange around the aperture, a resilient sealing member having an inner sleeve and an annular skirt radially outward of the sleeve, their upper portions being continuously joined and their lower portions being spaced in the formation of an annular groove, the flange of the container top member being accommodated sealingly in said groove, and a rigid tiltable valving spout having a tubular stem, a valve head operable inwardly of the container top member closing the inner stem end, a lateral port penetrating the stem wall adjacent the valve head, and a neck portion extending through the flanged aperture and sealed within the sleeve portion of the sealing member, the inner surface of the container top wall and the upper surface portion of the valve head presented thereagainst having mutually mating, annular ring-and-groove formations, whereby the valve head closes the container sealedly when in erect position and is restrained from lateral sliding upon being tilted.

2. A tiltable dispensing valve for gas pressure containers, comprising an apertured top member having an outward flange around the aperture, a resilient sealing member having an inner sleeve and an annular skirt radially outward of the sleeve, their upper portions being continuously joined and their lower portions being spaced in the formation of an annular groove, the flange of the container top member being accommodated sealingly in said groove, and a rigid tiltable valving spout having a tubular stem, a valve head closing the inner stem end, a lateral port penetrating the stem wall adjacent the valve head, and a neck portion extending through the flanged aperture of the container top member and penetrating and sealed within the sleeve portion of the sealing member, the valve head having an upper surface portion closing against an annular area of the inner surface of the container top wall around the aperture, said annular area having a coating of resilient sealing material against which the valve head seats upon closing.

3. A tiltable dispensing valve as defined in claim 2, the rigid valving spout having an inwardly presented annular shoulder spaced outward from the upper end of the sealing member, together with a resilient skirt-shaped seal cover having an annular upper margin presented abuttingly against the shoulder of the valving spout and an enlarged annular lower margin presented abuttingly against the outer surface of the container top wall around the sealing member skirt, the skirt-shaped seal cover further having an inner surface presented confiningly against the outer surface of the skirt of the sealing member and against the upper end thereof, the seal cover cooperating with the sealing member as a resilient spring urging the valving spout to erect, centered position.

References Cited in the file of this patent
UNITED STATES PATENTS

| | | |
|---|---|---|
| 2,565,954 | Dey | Aug. 28, 1951 |
| 2,612,293 | Michel | Sept. 30, 1952 |
| 2,615,597 | Tomasek et al. | Oct. 28, 1952 |
| 2,621,014 | Efford | Dec. 9, 1952 |
| 2,658,714 | Fooshee | Nov. 10, 1953 |